United States Patent [19]

Jacks

[11] Patent Number: 5,544,803
[45] Date of Patent: Aug. 13, 1996

[54] PORTABLE ELECTRIC DESOLDERING TOOL

[75] Inventor: David C. Jacks, Pomona, Calif.

[73] Assignee: Cooper Industries, Inc., Houston, Tex.

[21] Appl. No.: 287,547

[22] Filed: Aug. 8, 1994

[51] Int. Cl.$^6$ .................................................. B23K 3/03
[52] U.S. Cl. ........................................ 228/20.5; 219/230
[58] Field of Search ............................ 228/20.5; 219/230

[56] References Cited

U.S. PATENT DOCUMENTS

| | | | |
|---|---|---|---|
| 3,172,382 | 3/1965 | Weglin | 228/20.5 |
| 4,328,920 | 5/1982 | Vella | 228/20.5 |
| 4,574,994 | 3/1986 | Rauchwerger | 228/20.5 |
| 4,768,699 | 9/1988 | Abbagnaro | 228/102 |
| 5,080,277 | 1/1992 | Diaconu et al. | 219/230 X |

FOREIGN PATENT DOCUMENTS

| | | |
|---|---|---|
| 0417923A1 | 3/1991 | European Pat. Off. . |
| 2644946 | 4/1978 | Germany . |

*Primary Examiner*—Kenneth J. Ramsey
*Attorney, Agent, or Firm*—Burns Doane Swecker & Mathis, L.L.P.

[57] ABSTRACT

A self contained desoldering gun (10) with a built in vacuum pump (40). Vacuum pump (40) is operated by a low voltage DC electric motor (50) which is connected electrically in series with heating tip (20). Heating tip (20) reduces the voltage in the circuit and reduces the size of the motor required to operate pump (40). A second heating element may be used when motor (50) is energized.

12 Claims, 2 Drawing Sheets

PORTABLE ELECTRIC DESOLDERING TOOL

BACKGROUND OF THE INVENTION

This invention relates to desoldering tools in general and in particular to a desoldering tool with a built in vacuum pump.

Currently most desoldering in the electronics trade is done with desoldering systems which consist of an electrical power base and desoldering handpiece. The base typically includes a pump and a transformer. The base is connected to the desoldering handpiece by an electric cord and a vacuum tube. The base sits on an electronics workbench while the operator holds the desoldering handpiece as she works. These systems are typically priced at more than $300.00 per unit.

The electrical desoldering tool must perform several functions. The tool generates heat at a tip which is applied to circuit board components. The tip melts the bonding solder. The tool also supplies a vacuum to draw the molten solder into a reservoir in the handpiece.

Present desoldering devices are cumbersome. They require an electric cord attached to the gun to energize the heating element for melting the solder. In addition, a vacuum hose must be attached to the gun to remove the melted solder from the circuit board. These two appendages are cumbersome for the operator to drag around. The vacuum pump and transformer are usually mounted on a bench in the vicinity of the desoldering operation.

The principal disadvantage of this type of system is the lack of portability due to the handpiece being tied to the base by an electrical cord and a pneumatic tube. This gives the operator the ability to move only about 4 to 5 feet from the base.

A prior art attempt to manufacture a self contained desoldering gun placed a vacuum pump in the handle of the desoldering gun. This eliminates the need for a pneumatic tube connected to the base. Typically, the motor used to power the vacuum pump operates with line voltage motors which are large and heavy. These are AC electric motors which operate at 100 or 120 volts and require significant insulation and weight. Consequently, the portable tool itself becomes large, heavy, and difficult to handle, especially over extended periods of time.

SUMMARY OF THE INVENTION

The present invention is directed to a self-contained desoldering gun having a built-in vacuum pump. The vacuum pump is operated by a low voltage electric motor which is electrically connected in partial series with a heating tip. The heating tip reduces the voltage in the circuit and reduces the size of the motor required to operate the pump. A portion of the heating tip which is not in partial series with the motor is electrically connected in parallel with the motor. In alternate embodiments, the heating tip can include separately formed first and second heating elements, the first heating element being connected in parallel with the motor and the second heating element being connected in series with the motor. Such a configuration allows the second heating element to be energized only when the motor of the vacuum pump is energized.

DETAILED DESCRIPTION OF THE DRAWINGS

Figure 1:
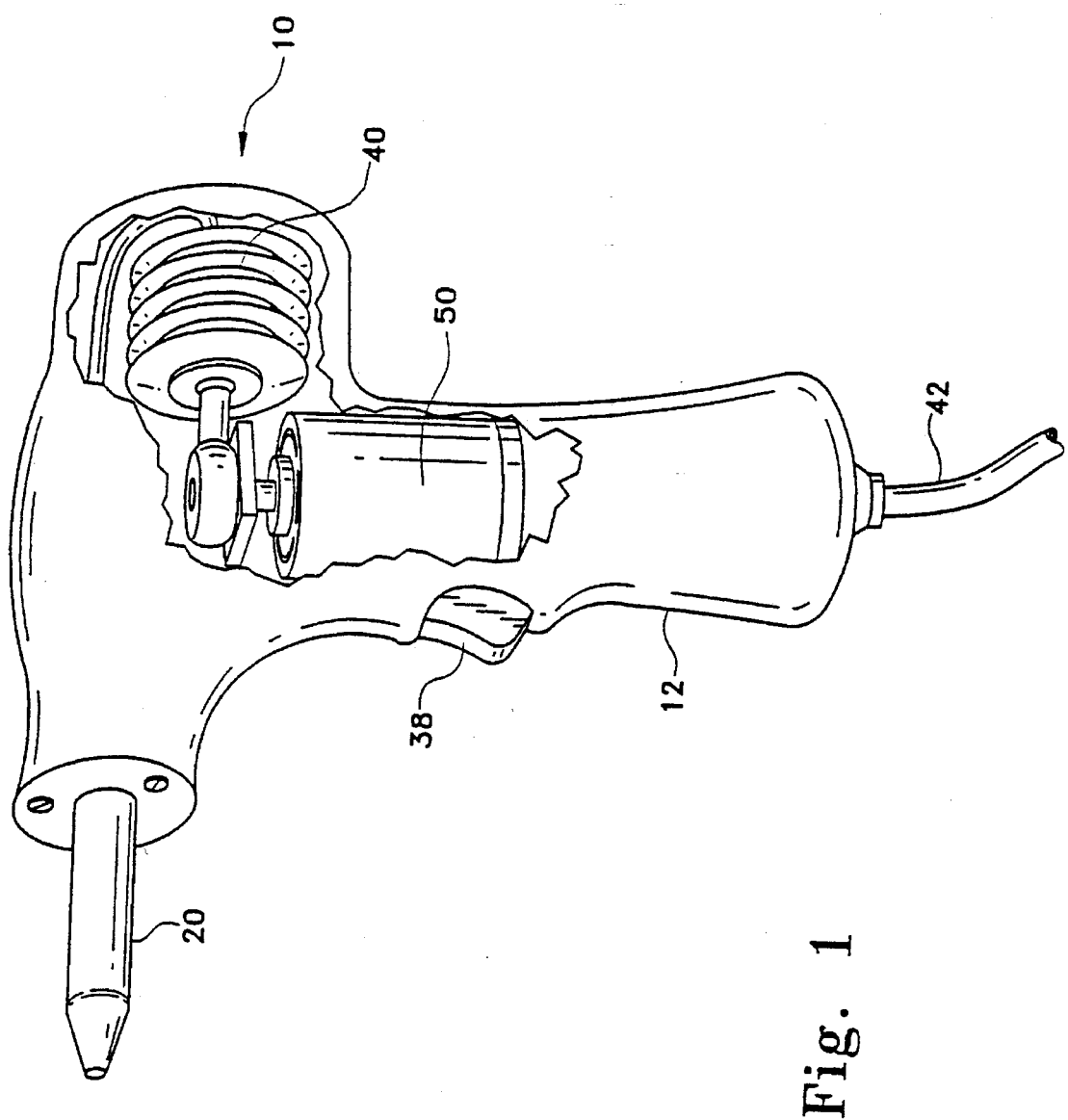
FIG. 1 is a perspective view, partly in section of a desoldering gun according to the present invention.

Referring now to FIG. 1 a desoldering gun according to the present invention is referred to in general by numeral 10. Major components of desoldering gun 10 are tip 20, electronic circuitry 30, vacuum pump 40, and low voltage DC motor 50.

A low voltage DC motor 50 located in the handle of the desoldering gun operates a gun mounted vacuum pump 40. AC line voltage 32 is received through cord 42.

Figure 2:
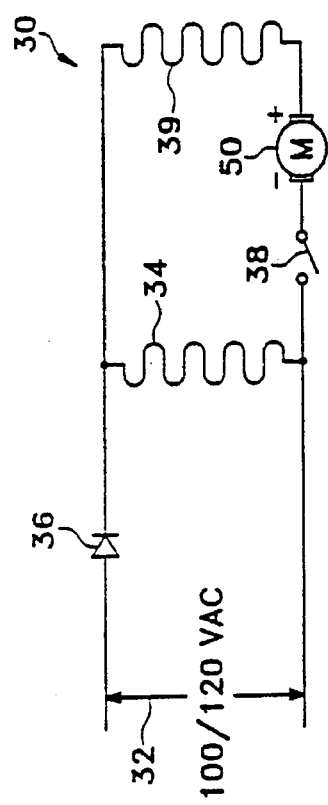
FIG. 2 is a schematic view of a desoldering gun circuit according to the present invention.

FIG. 2 shows a circuit. Line voltage 32 is converted to DC current by rectifier 36 and is reduced in voltage by placing the heating element 34 of the desoldering gun in partial series with the pump motor 50. In the FIG. 2 embodiment, a portion of the heating element 34 which is not in series with the pump motor 50 is in parallel with the pump motor 50 when the pump motor is energized. Switch 38 is used to energize motor 50.

The present invention solves the problems associated with operating a heavy hand held tool. It also yields a substantial cost savings. The invention utilizes a low voltage motor 50, for example, a 24 volt DC motor in the preferred embodiment. A low voltage motor is used without a transformer which reduces weight. This is achieved by utilizing the heater element 34 as part of the voltage drop (IR drop) which reduces the line voltage 32 to the amount required by the DC motor 50. The voltage drop creates heat which is used in the desoldering process.

There are several advantages of using a low voltage motor. Low voltage DC motors are substantially less expensive than line voltage AC motors. Low voltage DC motors are also smaller in size than line voltage AC motors and hence, yield a smaller and easier-to-handle tool. Low voltage DC motors are also lighter in weight than line voltage AC motors, hence yielding a lighter desoldering tool and reducing operation fatigue.

Figure 3:
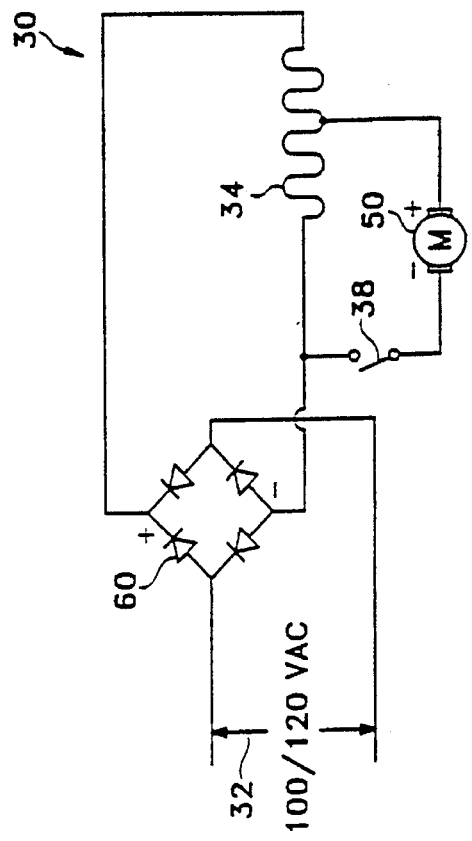
FIG. 3 is a schematic view of an alternate desoldering gun circuit according to the present invention.

In another embodiment of the invention shown in FIG. 3, a second stage heater 39 is employed which operates only when the pump motor is working to prevent cooling of the desoldering tip 20. This embodiment achieves additional benefits. This embodiment uses a second heater 39 when the vacuum pump is energized. When the desoldering tool is being used to melt the solder, only one element 34 is powered. However, upon reflow of the solder and the subsequent energizing of the vacuum pump, the secondary heater is energized to drop the voltage for the motor. This eliminates the problem of "heat sinking". When the desoldering tip touches a component or circuit board, the temperature of the tip will drop as a result of the heat sinking capacities of the component on the printed circuit board. The drop in temperature can hinder reflowing the solder and the success of the desoldering operation. A further complication arises when the vacuum is energized and draws cool air over the molten solder. This drops the temperature further. The present invention's use of a secondary sequential heater gives a thermal boost at the time of the vacuum pump activation. This assists in maintaining the reflow of the molten solder and preventing further temperature drops.

Figure 4:
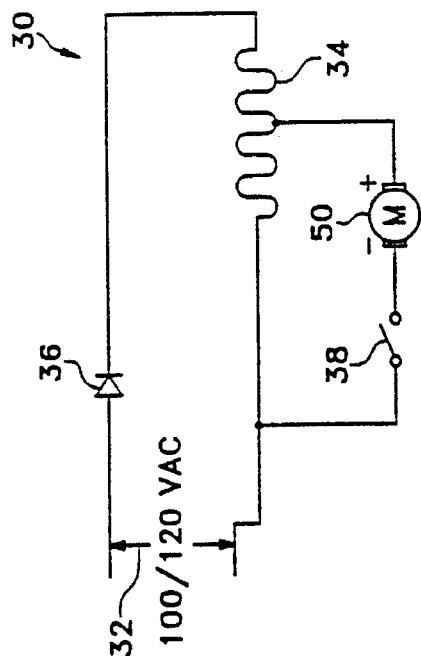
FIG. 4 is a schematic view of another desoldering gun circuit according to the present invention.
Figure 5:
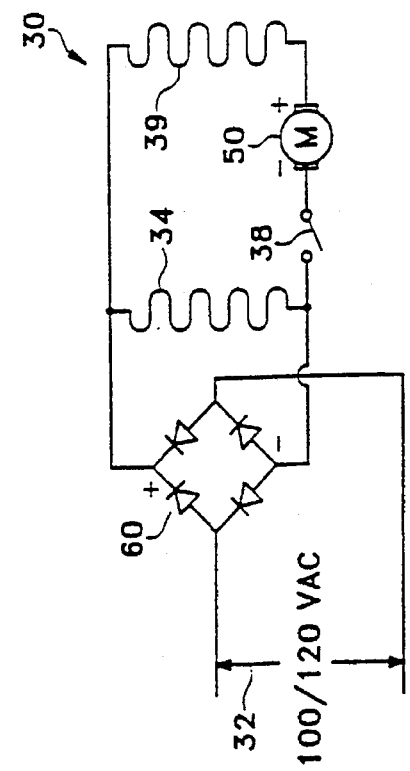
FIG. 5 is a schematic view of yet another desoldering gun circuit according to the present invention.

FIGS. 4 and 5 show alternative circuit diagrams which may be used with the present invention. A bridge circuit 60 is used to rectify line voltage 32 in these embodiments.

I claim:

1. An electronic desoldering gun comprising:

a heating tip;

a vacuum pump connected to said heating tip; and an electric motor connected to said pump, wherein said heating tip is electrically connected in partial series with said motor.

2. A desoldering gun as in claim 1 wherein a rectifier is connected in series with said heating tip and said motor.

3. A desoldering gun as in claim 2 wherein said motor is a DC motor.

4. A desoldering gun as in claim 1 wherein said motor is an AC motor.

5. A desoldering gun as in claim 1, wherein a portion of said heating tip which is not electrically connected in partial series with said motor is electrically connected in parallel with said motor.

6. A desoldering gun as in claim 1, wherein said vacuum pump is provided for drawing molten solder during operation of said heating tip.

7. A desoldering gun as in claim 1, wherein said vacuum pump is provided for drawing molten solder and said heating tip includes a first heating element and a second heating element, said first heating element being in parallel with said motor and said second heating element being in series with said motor.

8. An electric desoldering gun comprising:

a heating tip;

a vacuum pump connected to said heating tip; and an electric motor connected to said pump, wherein said motor is connected electrically in parallel with a first heating element of said heating tip and in series with a second heating element of said heating tip.

9. A desoldering gun as in claim 8, wherein a rectifier is connected in series with said heating tip.

10. A desoldering gun as in claim 8, wherein said motor is a DC motor.

11. A desoldering gun as in claim 8, wherein said second heating element is energized in series with said motor.

12. A desoldering gun as in claim 8, wherein said vacuum pump is provided for drawing molten solder during operation of said heating tip.

* * * * *